United States Patent
Müller et al.

[11] Patent Number: 5,836,416
[45] Date of Patent: Nov. 17, 1998

[54] SETTING-ELEMENT CONTROL ARRANGEMENT AND METHOD FOR MOTOR VEHICLE LONGITUDINAL SPEED AND/OR THE STEERING ANGLE

[75] Inventors: Manfred Müller, Nürnberg; Werner Reichelt, Esslingen; Peter Frank, Stuttgart; Johannes Clauss, Bietigheim-Bissingen, all of Germany

[73] Assignee: Mercedes-Benz AG, Germany

[21] Appl. No.: 774,723

[22] Filed: Jan. 3, 1997

[30] Foreign Application Priority Data

Jan. 4, 1996 [DE] Germany .................. 196 00 140.4

[51] Int. Cl.$^6$ .................................................. B60K 26/00
[52] U.S. Cl. ......................... 180/333; 180/315; 180/336
[58] Field of Search ................................. 180/333, 334, 180/315, 332, 336, 78

[56] References Cited

U.S. PATENT DOCUMENTS

| | | | |
|---|---|---|---|
| 5,052,512 | 10/1991 | Pakosh et al. | 180/334 |
| 5,261,291 | 11/1993 | Schoch et al. | 180/333 |
| 5,497,847 | 3/1996 | Ota et al. | 180/333 |
| 5,566,586 | 10/1996 | Lauer et al. | 180/333 |

FOREIGN PATENT DOCUMENTS

| | | |
|---|---|---|
| 927775 | 6/1963 | United Kingdom . |
| 1141170 | 1/1969 | United Kingdom . |

*Primary Examiner*—J. Woodrow Eldred
*Attorney, Agent, or Firm*—Evenson, McKeown, Edwards & Lenahan, P.L.L.C.

[57] ABSTRACT

Setting-element arrangement controls the longitudinal speed and/or the steering angle of a motor vehicle. More specifically, a user-actuable setting element which, during forward motion, when actuated in a respectively first actuation direction, brings about a change of the parameter controlled thereby in a first change direction and, when actuated out of the position of rest into a respectively second actuation direction which is opposite the first, brings about a change of this parameter in a second change direction opposite to the first. In such a setting-element arrangement, the assignment of the two change directions of the longitudinal speed and/or of the steering angle to the respectively first or second actuation direction of the setting element is inverted, during reverse motion, in relation to that during forward motion. The driver's intuitive association of a setting-element actuation corresponding to the desired dynamic vehicle reaction is thus maintained, even during reverse motion.

21 Claims, 1 Drawing Sheet

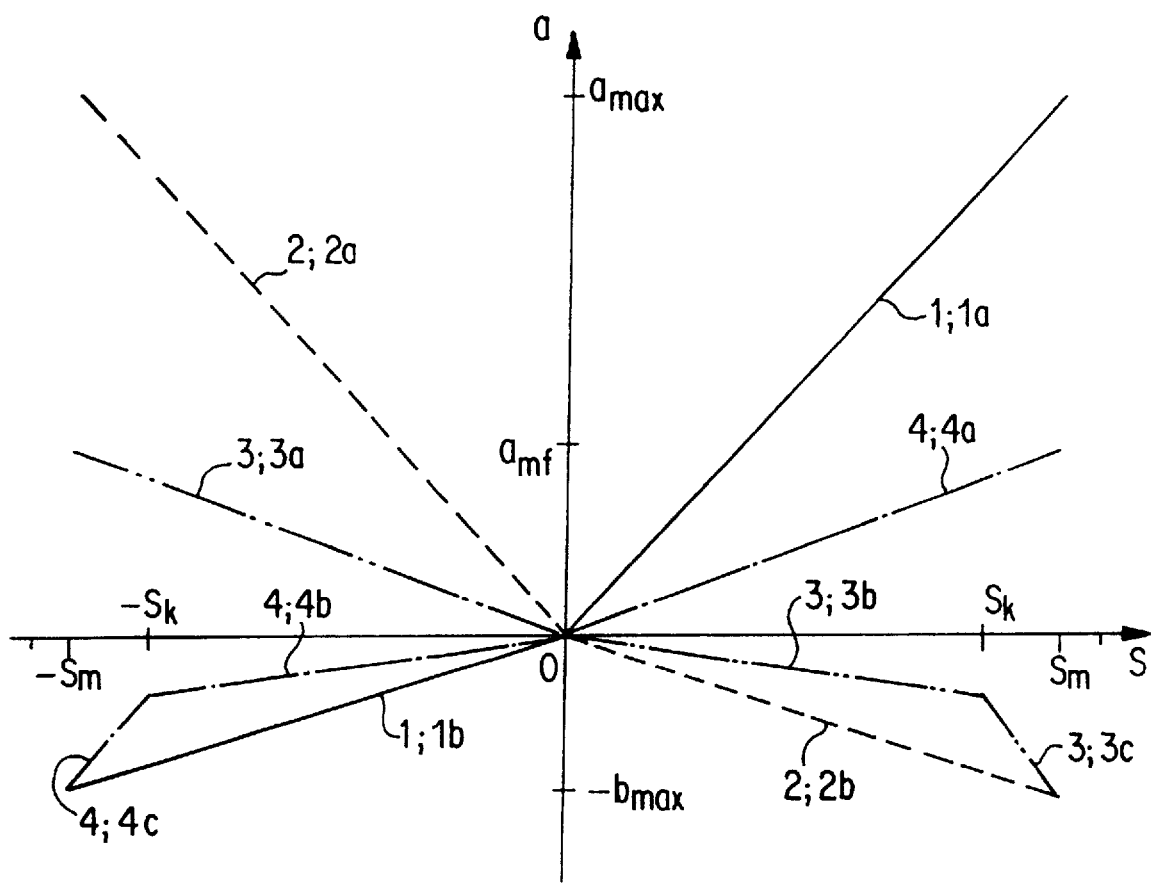

SETTING-ELEMENT CONTROL ARRANGEMENT AND METHOD FOR MOTOR VEHICLE LONGITUDINAL SPEED AND/OR THE STEERING ANGLE

CROSS-REFERENCE TO RELATED APPLICATIONS

This application is related to application Ser. No. 08/774,724 filed Jan. 3, 1997 in the name of Manfred MUELLER et al. for OPERATING-ELEMENT CONTROL ARRANGEMENT FOR MOTOR VEHICLE LONGITUDINAL MOVEMENT.

BACKGROUND AND SUMMARY OF THE INVENTION

The present invention relates to a setting-element arrangement for controlling the longitudinal speed or longitudinal acceleration and/or the steering angle of the motor vehicle having a user-actuable setting element which, during forward motion of the vehicle effects a change of the longitudinal speed in a first change direction and effects a change of the longitudinal speed in a second change direction opposite to the first actuation direction when actuated in a second actuating direction opposite to the first.

In an arrangement of the above-mentioned type, the user-actuable setting element, which is preferably configured as a control stick capable of one-handed operation, serves, instead of a conventional accelerator-pedal and brake-pedal arrangement and/or a conventional steering wheel, as a user interface for controlling the relevant physical parameter, i.e, the longitudinal speed or the steering angle of a motor vehicle.

As regards the control of longitudinal speed, an actuation of the setting element during forward motion in a first actuation direction, for example forwards, increases vehicle speed, and actuation in an opposite, second actuation direction (i.e., for example, rearwards) reduces vehicle speed. The speed change takes place according to a predetermined characteristic, via which the vehicle speed to be set or the vehicle positive or negative acceleration (deceleration) to be set is fixed in dependence on the actuating travel of the setting element. In this way, only the one setting element needs to be actuated in order to accelerate and brake the vehicle.

The steering of the vehicle by left/right or rotational movements of the setting element are preferably additionally carried out in a similar way via this one setting element, with the conventional steering wheel being dispensed with. Setting-element arrangements of this type are described in U.S. Pat. No. 3,022,850 and the publication by H. Bubb, Arbeitsplatz Fahrer—Eine ergonomische Studie [Driver Work Station—An Ergonomic Study], Automobil-Industrie [Automobile Industry] 3/85,page 265.

The actuation directions for the setting element are selected to match the parameter to be set, for example a left/right movement of the setting element for vehicle steering, a forward movement of the setting element for accelerating the vehicle and, correspondingly, a rearward movement for decelerating or braking the vehicle. A fixed obvious assignment of this type between a setting-element actuation direction and a vehicle control function influenced thereby can be unsatisfactory for vehicles which are driven not only forwards, but also backwards. In particular, although the assignment of a forward movement of the setting element to vehicle acceleration and of a backward movement of the latter to vehicle deceleration or braking corresponds, during forward motion, to the driver's intuitive association with regard to the desired vehicle dynamic reaction, this association is lost in the case of reverse motion. It may therefore happen that the driver, who wants to decelerate or brake the vehicle during reverse motion, intuitively moves the setting element opposite to the direction of motion, that is to say forwards, which, however, in the case of setting-element arrangements having a fixed function assignment designed for forward motion, in reality leads to a rearward vehicle acceleration.

DE 38 19 446 A1 describes a device for the change-over of, in particular, steering gears suitable for track-laying vehicles. The transmission direction of the steering movement of a steering-wheel shaft can be reversed in the event of a change in the direction of motion.

Preliminary publication DT 17 80 106 B2 describes a setting device of a hydrostatically mechanical planetary steering gear for tracklaying vehicles. In the event of a reversal in the direction of motion and a constant position of the steering lever, the tracklaying vehicle pivots about than same curve center, but in the opposite rotational direction, so that the vehicle travels on the same curve radius during forward motion and during reverse motion.

An object of the present invention is to provide a setting-element arrangement which offers a high degree of operating convenience for controlling the longitudinal speed and/or the steering angle of a motor vehicle both during forward and reverse motion.

This object has been achieved by a setting-element arrangement in which assignment of the two change directions of the longitudinal speed to the respective first and second longitudinal-speed actuation directions of the setting element is inverted during reverse motion of the vehicle, in relation to the assignment during the forward motion.

In this new arrangement, an appropriate reversal of the assignment of the speed-increase function and of the speed-reduction function to the right and left to the respective first and second actuation directions ensures that, in order to trigger the same function controlling the speed, i.e. an acceleration or a deceleration operation to the right or left, the setting element must in each case be actuated during reverse motion in the opposite direction to that during forward motion, this corresponding to the reversed direction of movement of the vehicle. Thereby, even during reverse motion, the driver can move the setting element in the correct way according to an intuitive association as regards the intended dynamic vehicle reaction.

In particular, the setting-element arrangement of the present invention can be configured so that during reverse motion, a rearward actuation of the setting element corresponds to an acceleration and a forward actuation corresponds to a deceleration of the reversing vehicle. During forward motion, however, the inverted function assignment is selected. Thereby, actuation in an actuation direction is to mean not only the generation of a setting travel. On the contrary, it can also mean solely the application of an actuating force acting in the relevant direction, without a setting travel thereby being generated by the driver.

According to another advantageous aspect of the present invention, a similar inversion of the setting-element actuating effect takes place in respect of the steering-angle setting. Thus, during reversing motion, a translational setting-element actuation to the right or as clockwise rotation can, in an inversion of the behavior during forward motion, correspond to a steering-angle change to the left.

A further advantageous feature of the present invention allows an automatic change-over to take place between the inverse function assignments during forward motion, on one hand, and reverse motion, on the other hand, by the selection of reverse gear.

In addition to the inversion of the function assignment for the longitudinal speed control, different sensitivities with regard to the speed change can be predetermined in dependence on the actuation of the setting element. Specifically, during reverse motion, a more finely controlling fine-control characteristic is used instead of a less finely controlling normal-control characteristic during forward motion. Thus, a given actuation of the setting element is assigned a lower speed change during reverse motion than during forward motion.

The fine-control characteristic provided for reverse motion can be used for a subsequent forward motion phase by an appropriate change-over in the rest position of the setting element and inversion of the function assignment.

With increasing actuating power, the fine-control characteristic is first flatter than the normal-control characteristic, but then, in an end portion of the vehicle-decelerating characteristic half, decreases to the same maximum deceleration value as the normal-control characteristic. Thereby, also for reverse motion or for forward motion with the selected fine-control characteristic, the same maximum vehicle deceleration can be activated as during forward motion with the normal-control characteristic.

During the change-over from reverse motion to forward motion, the fine-control characteristic for forward motion is actuated automatically. As a result, for subsequent forward motion, the vehicle acceleration characteristic is initially maintained in dependence on the actuation of the setting element, as in the preceding phase of reverse motion which feature is useful, for example, in parking.

Depending on the instance of use, the actuation of the setting element can be assigned, a positive or negative desired acceleration to be set in each case or a desired speed to be set.

BRIEF DESCRIPTION OF THE DRAWING

These and other objects, features and advantages of the present invention will become more readily apparent from the following detailed description of currently preferred embodiments when taken in conjunction with the sole figure.

The single FIGURE is a diagram of vehicle acceleration in dependence on the actuating travel of the setting element, with various characteristics for a setting-element arrangement for controlling the longitudinal speed of a motor vehicle in accordance with the present invention.

DETAILED DESCRIPTION OF THE DRAWING

In the diagram, a vehicle acceleration a, capable of being set via a manually operable setting element of a setting-element arrangement for controlling the longitudinal speed of a motor vehicle, is plotted by arbitrary scaling in dependence on the actuating travel s of this setting element. The diagram represents a various characteristics 1 to 4 which are used for this setting-element arrangement for predetermining the characteristic of the longitudinal speed control. Only linear characteristics are shown, but non-linear characteristics can also be used, for example characteristics which are parabolic about the zero position. Not only the acceleration may serve as the parameter assigned to the deflection of the setting element, as illustrated, but also the speed itself.

The setting-element arrangement itself can have any conventional configuration, such as is described by way of example in the above-mentioned publications, and does not require therefore more detailed description at this juncture. The characteristics are stored in a memory of a control unit of the setting-element arrangement. The control unit converts the actuations of the setting element into corresponding activating signals for the vehicle drive and the vehicle brakes.

Without any restriction in generality, it may be assumed for the described example that influencing of the vehicle longitudinal speed is carried out by moving the setting element, which, in particular, can be a control stick capable of one-handed operation, out of a rest position, into which the setting element in each case returns automatically in the absence of any forward or rearward force exerted thereon, in order respectively to accelerate or decelerate the vehicle.

In particular, moving the setting element by a specific actuating travel s out of its rest position in each case sets an associated acceleration value a according to the characteristic 1 to 4 which was just active. In the diagram, positive values of the actuating travel s which are located on the right of the coordinate origin 0 correspond to actuations of the setting element which are directed forwards parallel to the longitudinal direction of the vehicle. Similarly, negative values of the acceleration travel s correspond to actuations of the setting element which are directed rearwards. Positive acceleration values located above the origin 0 correspond to actual vehicle accelerations, and the negative acceleration values located below the origin 0 constitute vehicle decelerations. With the illustrated characteristics 1 to 4, the following activation characteristics for setting the longitudinal vehicle speed can be implemented by the setting-element arrangement.

In the normal forward direction driving mode, the characteristic 1 represented by an unbroken line is used, ascending linearly in its acceleration portion 1a up to a maximum vehicle acceleration $a_{max}$ which is set when the setting element is in its position moved as far forwards as possible, i.e. when its maximum deflection $s_m$ is forward. In its deceleration portion 1b, the characteristic 1 likewise runs linearly, but with a lower gradient than in the accelerating characteristic portion 1a. Advantageously, as a result thereof, when the setting element is actuated into its position $-s_m$ pointing as far rearwards as possible, in which it is at the same distance $s_m$ from its position of rest as in the position $+s_m$ deflected the furthest forwards, there is a minimum negative acceleration value $-b_{max}$, i.e. a maximum deceleration amount $b_{max}$, which is smaller in amount than the maximum positive acceleration value $a_{max}$. The setting of a vehicle acceleration, with the setting element actuated forwards, and of a deceleration, with the setting element actuated rearwards, corresponds to the driver's intuitive association of the desired dynamic vehicle reaction during forward motion. That is, the driver actuates the setting element forwards for a faster forward movement of the vehicle and rearwards to achieve a slower forward movement.

When reverse gear is selected, for example by way of a conventional automatically shifting transmission, an appropriate change-over device allows a change-over to take place automatically from the above normal-control characteristic 1 for forward motion to a fine-control characteristic 3 for motion in reverse, which is represented in the figure by a line of dashes and double dots. If appropriate, a conventional shift lever for such an automatically shifting transmission can be dispensed with, and a simple shift knob is provided for making the change-over between forward motion and reverse motion.

The fine-control characteristic 3 differs from the normal-control characteristic 1 first in the inversion of the function assignment, that is to say positive forward-directed actuating travels of the setting element are assigned negative vehicle-decelerating acceleration values, and rearward-directed actuations of the setting element are assigned positive vehicle acceleration values. This inversion of the function assignment allows for the obvious fact that the direction of longitudinal movement of the vehicle during reverse motion is opposite to that during forward motion. Consequently, as a result of this measure, the above-mentioned intuitive association of the driver as regards the actuation of the setting element is also correct in the case of reverse motion. Consequently, during reverse motion, the driver actuates the setting element in the direction of movement of the vehicle, that is to say rearwards, to move backwards more quickly, and opposite to the direction of movement of the vehicle, that is to say forwards, to brake the backward movement.

As is further evident from the figure, the fine-control characteristic 3 for reverse motion runs linearly with a smaller gradient than the accelerating portion 1a of the normal-control characteristic 1. This allows for the fact that the acceleration values which are required during motion in reverse are not as high as during forward motion and, instead, a finer adjustability of the vehicle acceleration is desired.

When the setting element is in its position $-s_m$ pointing as far rearwards as possible, this consequently signifies, during reverse motion, the requirement of maximum acceleration a $_{mf}$ in the fine-control mode which is considerably lower than the maximum acceleration a $_{max}$ in the normal-control mode during forward motion. In an initial vehicle-decelerating portion 3b, the fine-control characteristic 3 is first flatter than the vehicle-decelerating portion 1b of the normal-control characteristic 1. Thereby, particularly in the range of smaller deflections s of the setting element, a finer setting of the vehicle deceleration a than in the normal-control mode becomes possible.

Beyond a specific deflection $S_k$ of the setting element, however, the vehicle-decelerating portion 3b of the fine-control characteristic 3 then merges into an end portion 3c of the latter which descends more steeply so that, when the setting-element deflection s $_m$ directed as far forwards as possible is reached, the same deceleration amount d $_{max}$ is set as by the continuously straight vehicle-decelerating portion 1b of the normal-control characteristic 1. This has the desired effect that, particularly in emergency situations, the vehicle can be braked just as quickly during reverse motion as during forward motion.

In a simplified embodiment, a normal-control characteristic 2, such as is represented by dashes in the figure, can also be used for motion in reverse. This characteristic 2 corresponds to a mirror reflection of the normal-control characteristic 1 for forward motion on the acceleration axis, i.e. an inversion of the function assignment of the setting element, with fine control being dispensed with during reverse motion. The vehicle-accelerating characteristic portion 2a and the vehicle-decelerating portion 2b of this normal-control characteristic 2 for reverse motion consequently correspond fully, with the exception of the reflection of the actuation direction of the setting element, to the corresponding vehicle-accelerating portion 1a and vehicle-decelerating portion 1b of the normal-control characteristic 1 for forward motion.

In certain driving situations, for example during manoeuvering and parking, it is advantageous if the above-described fine-control behavior of the setting element controlling the vehicle longitudinal speed for reversing phases, is also available for forward motion phases. This is allowed for by the fact that, via a corresponding push-button of the setting-element arrangement for forward motion, a change-over can be made between the above-described normal-control characteristic 1 and a fine-control characteristic 4 which is represented by dot-and-dash lines in the figure.

The fine-control characteristic 4 for forward motion corresponds to an inversion of the function assignment of the fine-control characteristic 3 for reverse motion. In the forward-motion fine-control mode, therefore, the vehicle acceleration is set by a vehicle-accelerating characteristic portion 4a which runs linearly from the origin 0 up to the maximum forward-directed setting-element deflection $s_m$, where it assumes the reduced maximum fine-control acceleration value a $_{mf}$. It runs in a similar way in its vehicle-decelerating portion, which is assigned setting-element actuations taking place rearwards, as far as the corresponding kink $-S_k$, along a relatively flat characteristic portion 4b and subsequently, as far as the setting-element deflection $-s_m$ directed as far rearwards as possible, with an end portion 4c kinking downwards, so that, once again, the same deceleration amount b $_{max}$ is achieved as in the case of the normal-control characteristic 1.

Of course, it must be understood that suitably blocking the pushbutton or rendering it inoperative ensures that the change-over between the normal-control characteristic 1 and the fine-control characteristic 4 is possible only when the setting element is in the rest position in order to prevent abrupt acceleration changes which otherwise occur. Instead of the necessary actuation of the pushbutton, in the case of a change-over of the characteristics from reverse motion to forward motion, the fine-control characteristic 4 for forward motion can be activated automatically. This is advantageous particularly when a fine-control characteristic 3 is employed during reverse motion. During parking, the same setting-travel/vehicle-behavior characteristic is thus maintained even during forward motion.

It is within the contemplation of the present invention to use setting-element arrangements in which the control of the longitudinal speed of the vehicle is carried out by characteristics modified in relation to those shown in the figure. In each case, it is characteristic that the function assignment of the speed increase and speed reduction to one setting-element actuation direction and to the other opposite to it is opposed, during reverse motion, to that during forward motion. Thus, in particular, the present invention also embraces setting-element arrangements in which a setting-element actuating travel set in a particular case does not correspond to a specific vehicle acceleration value, as in the present case but to a specific desired speed value. During forward motion, for example the rearmost setting-element position can then be assigned the speed zero and the foremost setting-element position can be assigned the maximum speed. Conversely, during reverse motion, the speed zero corresponds to the foremost setting-element position and the maximum reversing speed corresponds to the rearmost position. During the change-over, however, a setting-element movement out of the old setting-element position into the new one, to which the speed zero is assigned, must be possible, without an acceleration of the vehicle taking place.

The inversion of the function assignment of vehicle acceleration and vehicle deceleration for controlling the longitudinal speed between forward motion and reverse motion can be provided in a similar way for a steering-angle control function by way of the setting element. The above-described fine-control function can be dispensed with and an oppositely acting coarse-control function used in its place. The latter is then designed so that steering-angle control for steering the vehicle to the left or right is carried out with higher sensitivity on both sides about the rest position of the setting element, and steering-angle setting is carried out with lower sensitivity on both sides outside this range.

As a further alternative to the above-described embodiments, the setting element can be configured as a pure "force-operated" setting element. Thereby, the operating force acting on the setting element is utilized for setting the physical parameter to be controlled, without the setting element being deflected. The resulting actuating force takes the place of the setting-element actuating travel in the above-described function diagrams.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Setting element arrangement for controlling longitudinal speed a motor vehicle, comprising
    a user-actuable setting element which, during forward motion of the vehicle, effects a change of the longitudinal speed in a first change direction when actuated in a first longitudinal-speed actuation direction, and effects a change of the longitudinal speed in a second change direction opposite to the first actuation direction when actuated in a second longitudinal-speed actuation direction opposite to the first; and
    means for inverting assignment of the two change directions of the longitudinal speed to the respective first and second longitudinal-speed actuation directions of the setting element during reverse motion of the vehicle, in relation to the assignment during the forward motion.

2. The setting-element arrangement according to claim 1, further comprising means for effecting,
    during the forward motion with the user-actuable setting element actuated in a first steering-angle actuation direction, a change of the steering angle in a first change direction and, with the user-actuable setting element actuated in a second steering-angle actuation direction opposite to the first steering-angle actuation direction, a change of the steering angle in a second change direction opposite to the first change direction; and
    means for inverting assignment of the two change directions of the steering angle to the first or second steering-angle actuation direction of the setting element during reverse motion, in relation to the assignment of the steering angle change direction during forward motion.

3. The setting-element arrangement according to claim 1, further comprising means for effecting automatic change-over between the forward-motion function assignment and reverse-motion function assignment inverted relative thereto of the setting element automatically with the selection of a transmission reverse gear.

4. The setting-element arrangement according to claim 3, further comprising means for effecting,
    during the forward motion with the user-actuable setting element actuated in a first steering-angle actuation direction, a change of the steering angle in a first change direction and, with the user-actuable setting element actuated in a second steering-angle actuation direction opposite to the first steering-angle actuation direction, a change of the steering angle in a second change direction opposite to the first change direction; and
    means for inverting assignment of the two change directions of the steering angle to the first or second steering-angle actuation direction of the setting element is inverted, during reverse motion, in relation to the assignment of the steering angle change direction during forward motion.

5. The setting-element arrangement according to claim 1, further comprising second means for effecting the forward-motion function assignment of the setting element according to a normal-control characteristic and the reverse-motion function assignment according to a fine-control characteristic having a function assignment inverted relative to the normal-control characteristic and having lower function-value amounts in an associated speed-change/setting-element actuation characteristic to control vehicle longitudinal speed.

6. The setting-element arrangement according to claim 5, further comprising third means for changing over the forward-motion function assignment between the normal-control characteristic and a fine-control characteristic obtained by inverting the function assignment of the fine-control characteristic for reverse motion when the setting element is in the rest position.

7. The setting-element arrangement according to claim 5, wherein the second means provides increasing setting-element actuation, a vehicle-decelerating portion of the fine-control characteristic for reverse motion having a flatter a first portion with relatively low setting-element actuation, and a steeper subsequent end portion than a vehicle-decelerating portion of the normal-control characteristic, so that, with maximum setting-element actuation, a maximum vehicle deceleration amount is the same as the normal-control characteristic.

8. The setting-element arrangement according to claim 7, further comprising third means for changing over the forward-motion function assignment between the normal-control characteristic and a fine-control characteristic obtained by inverting the function assignment of the fine-control characteristic for reverse motion when the setting element is in the rest position.

9. The setting-element arrangement according to claim 6, wherein the fine-control characteristic for forward motion is activated automatically with a change-over from the reverse-motion function assignment to the forward-motion function assignment.

10. The setting-element arrangement according to claim 9, wherein the second means provides increasing setting-element actuation, a vehicle-decelerating portion of the fine-control characteristic for reverse motion having a flatter a first portion with relatively low setting-element actuation, and steeper a subsequent end portion than a vehicle-decelerating portion of the normal-control characteristic, so that, with maximum setting-element actuation, a maximum vehicle deceleration amount is the same as the normal-control characteristic.

11. The setting-element arrangement according to claim 1, wherein an actuation of the setting element in the first and second longitudinal speed actuation directions is assigned one of a positive and negative acceleration of the vehicle.

12. The setting-element arrangement according to claim 1, wherein an actuation of the setting element in one of the longitudinal speed actuation directions is assigned a desired vehicle speed and an actuation in the other of the actuation directions is assigned a desired brake actuation.

13. Method for controlling longitudinal speed of a motor vehicle, comprising the steps of actuating, during forward motion of the vehicle, a setting element in a first longitudinal speed actuation direction to effect a change of the longitudinal speed in a first change direction and in a second longitudinal speed actuation direction to effect a change of the longitudinal speed in a second change direction opposite to the first change direction; and inverting the assignment of the two change directions of the longitudinal speed to the respective first and second longitudinal speed actuation direction of the setting element during reverse motion of the vehicle, in relation to the assignment during the forward motion.

14. The method according to claim 13, further comprising means for effecting, during the forward motion with the user-actuable setting element actuated in a first steering-angle actuation direction, a change of the steering angle in a first change direction and, with the user-actuable setting element actuated in a second steering-angle actuation direction opposite to the first steering-angle actuation direction a change of the steering angle in a second change direction opposite to the first change direction; and means for inverting assignment of the two change directions of the steering angle to the first or second steering-angle actuation direction of the setting element is inverted, during reverse motion, in relation to the assignment of the steering angle change direction during forward motion.

15. The method according to claim 13, further comprising means for effecting automatic change-over between the forward-motion function assignment and reverse-motion function assignment inverted relative thereto of the setting element automatically with the selection of a transmission reverse gear.

16. The method according to claim 13, further comprising second means for effecting the forward-motion function assignment of the setting element according to a normal-control characteristic and the reverse-motion function assignment according to a fine-control characteristic having a function assignment inverted relative to the normal-control characteristic and having lower function-value amounts in an associated speed-change/setting-element actuation characteristic to control vehicle longitudinal speed.

17. The method according to claim 16, further comprising third means for changing over the forward-motion function assignment between the normal-control characteristic and a fine-control characteristic obtained by inverting the function assignment of the fine-control characteristic for reverse motion when the setting element is in the rest position.

18. The method according to claim 16, wherein the second means provides increasing setting-element actuation, a vehicle-decelerating portion of the fine-control characteristic for reverse motion having a flatter a first portion with relatively low setting-element actuation, and a steeper subsequent end portion than a vehicle-decelerating portion of the normal-control characteristic, so that, with maximum setting-element actuation, a maximum vehicle deceleration amount is the same as the normal-control characteristic.

19. The method according to claim 17, wherein the fine-control characteristic for forward motion is activated automatically with a change-over from the reverse-motion function assignment to the forward-motion function assignment.

20. The method according to claim 13, wherein an actuation of the setting element in the first and second longitudinal speed actuation directions is assigned one of a positive and negative acceleration of the vehicle.

21. The method according to claim 13, wherein an actuation of the setting element in one of the longitudinal speed actuation directions is assigned a desired vehicle speed and an actuation in the other of the actuation directions is assigned a desired brake actuation.

* * * * *